United States Patent
Pekowski et al.

[11] Patent Number: 6,003,095
[45] Date of Patent: Dec. 14, 1999

[54] APPARATUS AND METHOD FOR DEMAND LOADING A DYNAMIC LINK LIBRARY

[75] Inventors: Raymond Paul Pekowski; Curt James Rousse, both of Austin, Tex.

[73] Assignee: International Business Machines Corporation, Armonk, N.Y.

[21] Appl. No.: 08/742,103

[22] Filed: Oct. 31, 1996

[51] Int. Cl.⁶ .................................................. G06F 9/44
[52] U.S. Cl. ............................................ 709/305; 395/710
[58] Field of Search ................................... 395/685, 710, 395/701; 709/305, 685

[56] References Cited

U.S. PATENT DOCUMENTS

| | | | |
|---|---|---|---|
| 5,247,678 | 9/1993 | Littleton ................................. | 395/700 |
| 5,247,681 | 9/1993 | Janis et al. ............................ | 395/700 |
| 5,291,601 | 3/1994 | Sands .................................... | 395/700 |
| 5,339,430 | 8/1994 | Lundin et al. ......................... | 395/700 |
| 5,369,766 | 11/1994 | Nakano et al. ....................... | 395/700 |
| 5,369,770 | 11/1994 | Thomason et al. ................... | 395/725 |
| 5,375,241 | 12/1994 | Walsh .................................... | 395/700 |
| 5,450,586 | 9/1995 | Kazura et al. ........................ | 395/700 |
| 5,475,840 | 12/1995 | Nelson et al. ......................... | 395/700 |
| 5,734,904 | 3/1998 | Kanamori et al. .................... | 395/685 |
| 5,812,848 | 9/1998 | Cohen ................................... | 395/685 |

OTHER PUBLICATIONS

"IBM OS/2 16/32–bit Object Module Format (OMF) and Linear eXecutable Module Format (LX), Revision 9," *IBM Corporation*, Nov. 1995.

*Primary Examiner*—Alvin E. Oberley
*Assistant Examiner*—Lewis A Bullock, Jr.
*Attorney, Agent, or Firm*—Jeffrey S. LaBaw; David H. Judson

[57] ABSTRACT

An apparatus and method for demand loading a dynamic link library (DLL) is disclosed. The method includes generating a demand load library for demand loading the DLL and replacing the reference library of the DLL with the demand load library.

46 Claims, 10 Drawing Sheets

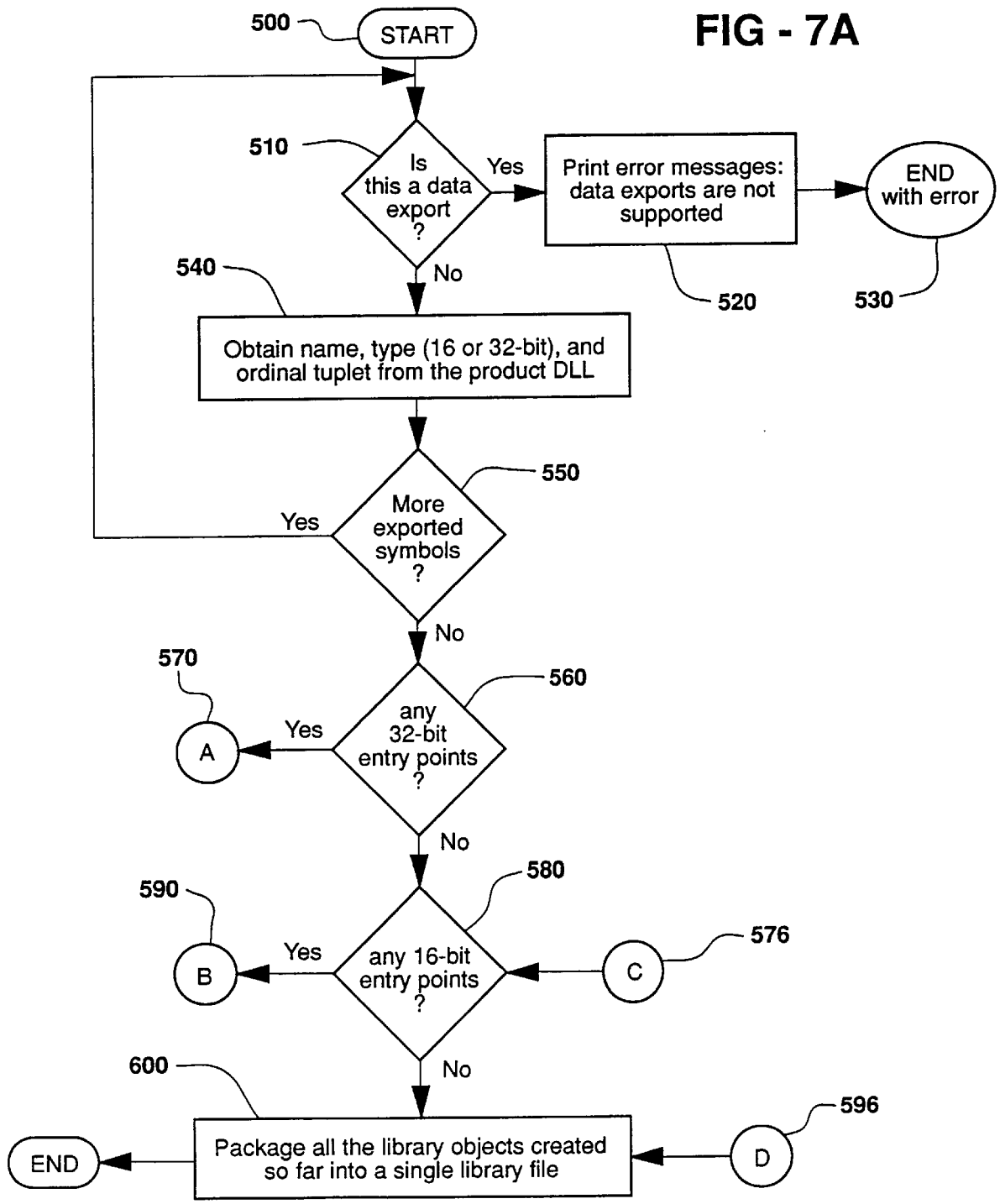

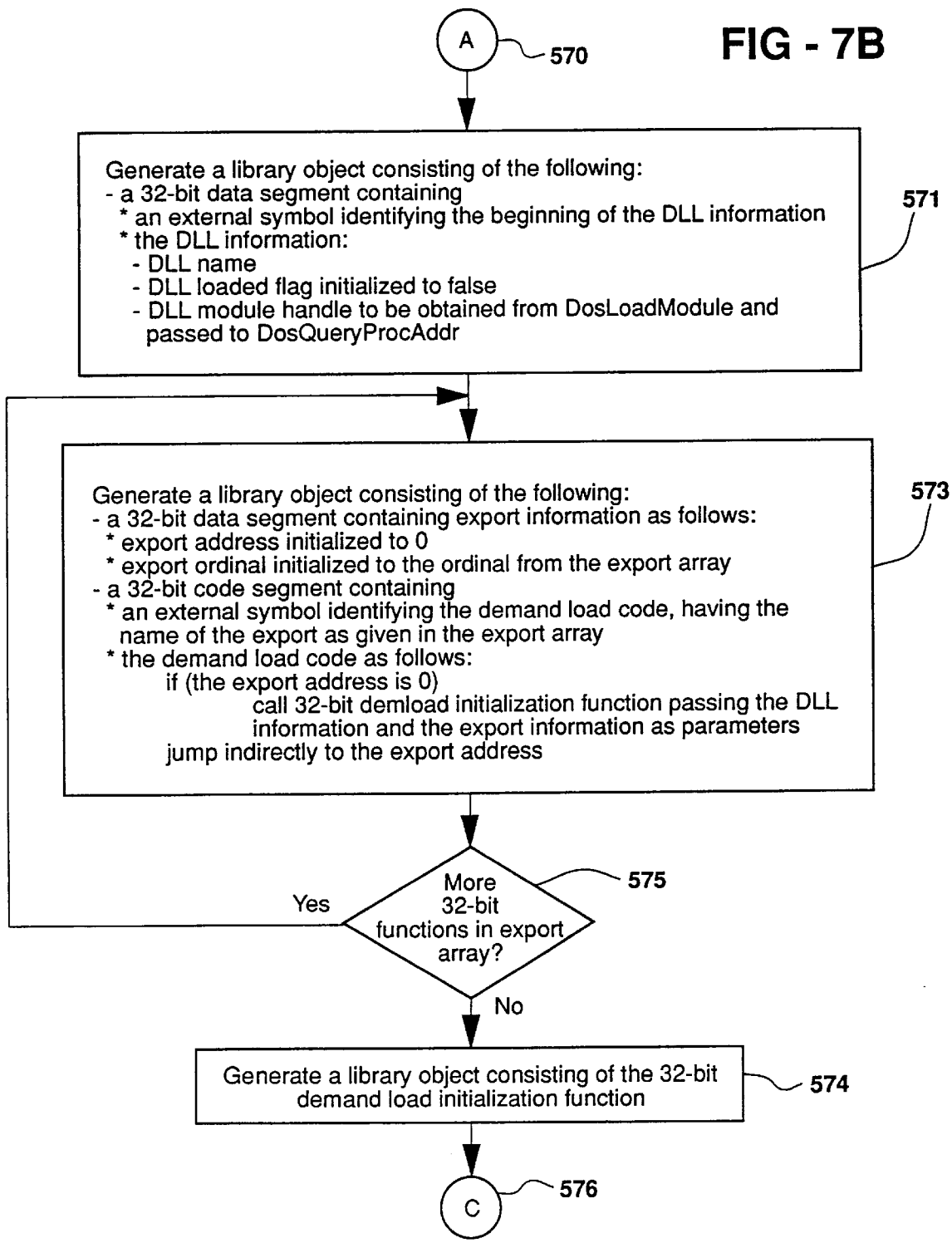

APPARATUS AND METHOD FOR DEMAND LOADING A DYNAMIC LINK LIBRARY

FIELD OF THE INVENTION

The present invention relates in general to information handling systems and more particularly to an apparatus and method for demand loading dynamic link libraries (DLLs) utilized in computer programs.

BACKGROUND OF THE INVENTION

A computer application program usually includes a number of separate routines. Typically, the routines include a main program and several subsidiary routines referred to as objects, modules, or resources. Execution of the application program begins with the main program with calls being made to the subsidiary routines. In order to operate as a complete program, prior to execution these routines are linked together using a linker such as 386 link. The linker copies each of the routines into an executable file for the application program. The linker also provides each of the routines with information identifying the locations of other routines so that the routines can access each other. The executable file can then be loaded into the memory of a computer such that the application program can be executed by the computer according to the instructions in the routines.

A dynamic link library (DLL) is an executable module or routine containing services that application programs can call to perform useful tasks, e.g., directory searches, login commands, searching functions, character string manipulations, etc. DLLs exist primarily to provide services to application programs. These libraries play an important role in operating systems such as Windows and OS/2, which use them to make their services and resources available to application programs.

DLLs are similar to run-time libraries. The main difference between DLLs and run-time libraries is that DLLs are linked with the application program at run time, that is, when the computer is executing the application program, not when the application program files are linked with the linker. Linking a library with an application program at run time is referred to as dynamic linking; linking a library with an application program by using the linker is referred to as static linking. The discussion below focuses on the OS/2 operating system, but those of ordinary skill in the art will understand that the following discussion applies equally to other operating systems, such as Windows, which utilize DLLs.

In order to access a DLL at run time, the application program must be able to obtain information indicating where to find the DLL. One method provided by operating systems utilizing DLLs is to use an import library, or reference library, which contains information regarding where to locate the DLL at run time. During linking, the linker uses statically linked reference libraries to resolve references to external services. As noted above, when an application program desires a service from a static link library, the linker copies the code for that service into the application program's executable file. When the application program desires a service run from a DLL, however, the linker does not copy any code from the DLL. Instead, the linker searches all defined import or reference libraries to find one that contains the necessary information regarding location of the DLL. The linker copies the necessary information from the reference or import library to create a dynamic link between the executing application program and the DLL.

When a process loads under the OS/2 operating system, all DLLs that the process references, either directly or indirectly, are also loaded. DLLs referencing other DLLs form a reference tree, the entire set of which gets loaded before the first instruction of the main program is executed. A typical DLL is only partially loaded. The remainder of the DLL is loaded on its first reference. The minimum DLL load requires some initialization in the operating system and the execution of the DLL's initialization routine. Any code or data referenced by the initialization routine, including the initialization routine itself, is loaded. For some DLLs, the dynamic link load time is quite expensive in terms of time, particularly if the DLL is very large or the DLL's initialization routine is very long.

Referring to FIG. 1, the several steps described above are depicted. The source program or application code 50, in a high level language such as C language, and DLL function prototypes 55 are processed by a compiler 60, producing an object code module 65. The object code module 65 is statically linked by a linker 70 to a DLL reference library 75 which resolves external references to the DLL to produce a load module 80 containing the application's executable file ready for loading and running in a computer.

The problem with load time initialization as described above is that frequently a process does not call the DLLs that it references. Therefore, the DLLs which are referenced but not called are unnecessarily loaded. When the load time of the unnecessary DLLs is a large percentage of the total execution time, the performance of the process degrades significantly.

There is a method utilized in the OS/2 operating system to prevent the unnecessary loading of DLLs. The method is called demand loading and is implemented using a well-known documented set of OS/2 operating system APIs (Application Program Interfaces). Demand loading is the process of delaying the load of a DLL until it is actually called. If a DLL is demand loaded but never demanded or called, it is effectively not loaded, and the cost of loading it is saved.

It will be appreciated that demand loading is utilized in other operating systems and creates problems similar to those encountered with the OS/2's demand loading technique.

The problem with the OS/2's demand loading technique is that it is difficult to use, particularly if a program has initially been written without it. It requires the programmer to replace a call to a target dynamic link with a load check, a couple of OS/2 demand loading APIs, and error recovery should the OS/2 APIs fail. The following C-like code illustrates this difficulty:

```
BEFORE (with no demand loading):
 x( )         /* call function X( );*/
AFTER (with OS/2's default demand loading):
 static funcptr x;
 if (x=0)        /* if entry point address has not loaded */
 {
   if(/DLL_to_load_is_not_loaded)   /* if DLL has not been loaded */
   {
     rc = DosLoadModule (DLL_to_Load);    /* load the DLL */
     if (rc)
     {
       Do_error_recovery( );
     }
     DLL_to_load_is_not_loaded = FALSE;
   }
   /*obtain the address of entry point x( ) */
   rc = DosQueryProcAddr (entry point identifier - either a name or
       ordinal number);
```

```
if (rc)
{
  Do_error_recovery( );
}
}
*x( ); /* call function x indirectly */
```

FIG. 2 illustrates the building of an application program with demand loading of DLLs directly coded into the application program. The application program or code 150 is modified to call the demand loading system calls from the operating system's APIs and call the DLL functions indirectly through function pointers as illustrated above in the C-like code. The DLL function prototypes 155 are modified to specify that the functions are called indirectly. The modified application code 150 and modified DLL function prototypes 155 are then compiled by compiler 160 to produce object code module 165. Object code module 165 is then linked by linker 170 to form a load module containing executable application code 180.

Given that demand loading is the solution to the load time initialization problem, what is needed is an alternative to direct coding of the OS/2 operating system's demand loading APIs.

SUMMARY OF THE INVENTION

Accordingly, the present invention provides a method for automatically generating the code necessary to implement the operating system's demand loading APIs. The resulting code is packaged into a library which replaces a statically linked DLL reference library. In this manner, the called DLL is not changed in any way, but a tool is run against it to automatically generate the demand loading library.

The present invention provides a method, implemented in an information handling system having an operating system, for demand loading a DLL having a reference library for resolving references to the DLL. The method comprises the steps of generating a demand load library for demand loading the DLL and replacing the reference library of the DLL with the demand load library. The step of generating a demand load library comprises the steps of finding all entry points into the DLL; and generating program code for performing the following steps for each entry point: determining whether an address corresponding to the entry point has been called before; if the address corresponding to the entry point has not been called before, then calling a demand loading initialization routine; and jumping indirectly to the address corresponding to the entry point. The step of calling a demand loading initialization routine includes the step of calling APIs from the operating system.

The present invention also provides a method, implemented in an information handling system having an operating system, for generating a demand load library for demand loading a DLL. The method comprises the steps of finding all entry points into the DLL; and generating program code for performing the following steps for each entry point: determining whether an address corresponding to the entry point has been called before; if the address corresponding to the entry point has not been called before, then calling a demand loading initialization routine; and jumping to the address corresponding to the entry point.

The present invention also includes a method, implemented in an information handling system having an operating system, for generating a demand load library for demand loading a DLL. The method comprises the steps of: inputting the DLL; extracting all entry points to the DLL; generating program code for performing the following steps for each entry point: determining whether an address corresponding to the entry point has been called before; if the address corresponding to the entry point has not been called before, then calling a demand loading initialization routine; and jumping to the address corresponding to the entry point. The method further includes the steps of packaging the program code into the demand load library for the DLL and outputting the demand load library for the DLL.

The present invention also includes a computer program product which implements the methods set forth above in a program of instructions stored on a program storage device readable by a computer system.

The present invention also provides an information handling system comprising at least one processor, memory operably associated with the processor, and an application program stored in the memory wherein the application program includes a DLL. The information handling system is characterized by a demand load library stored in the memory for demand loading the DLL.

The main advantage of the present invention is providing demand loading of a DLL without modification to the application program or the DLL function prototypes.

Another advantage of the present invention is providing an apparatus and method, i.e. a demand load tool, which automatically generates demand loading code for demand loading a DLL, thereby saving time required by a programmer to manually code the demand load code into the application program.

BRIEF DESCRIPTION OF THE DRAWINGS

FIGS. 7A, 7B, and 7C illustrate a detailed flow chart of the invention.

DETAILED DESCRIPTION OF A PREFERRED EMBODIMENT OF THE INVENTION

In the following description, for purposes of explanation, specific program procedures, APIs, and configurations are set forth to provide a thorough understanding of the present invention. The preferred embodiment described herein is implemented with an OS/2 operating system created by IBM (OS/2 and IBM are registered trademarks of International Business Machines Corporation). However, it will be apparent to one skilled in the art that the present invention may be practiced without the specific details and be implemented in various computer systems utilizing various operating systems and in various configurations or makes or models of tightly coupled processors or in various configurations of loosely coupled multiprocessor systems. The procedural descriptions and representations which follow are the means used by those skilled in the art to convey the substance of their work to others skilled in the art.

Figure 3:
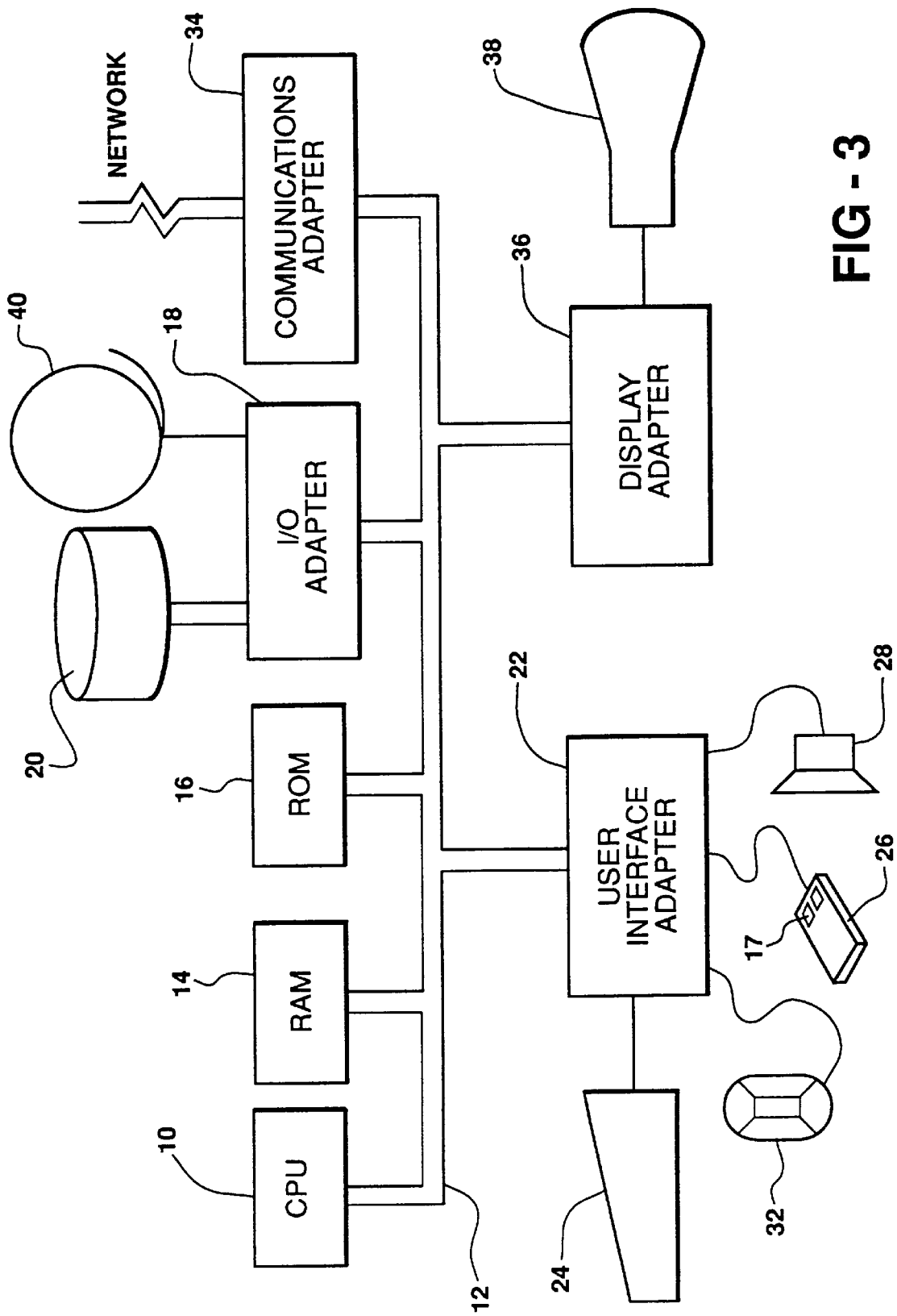
FIG. 3 is an information handling system embodying the present invention.

The detailed descriptions which follow are presented in terms of program procedures executed on or in an information handling system generically referred to as a computer or a network of computers. A representative hardware environment for practicing the present invention is depicted in FIG. 3, which illustrates a typical hardware configuration of a computer or information handling system in accordance with the subject invention, having at least one central processing unit (CPU) 10. CPU 10 is interconnected via system bus 12 to random access memory (RAM) 14, read only memory (ROM) 16, and input/output (I/O) adapter 18 for connecting peripheral devices such as disc units 20 and tape drives 40 to bus 12, user interface adapter 22 for connecting keyboard 24, mouse 26 having button 17, speaker 28, microphone 32, and/or other user interfaced devices such as a touch screen device (not shown) to bus 12, communication adapter 34 for connecting the information handling system to a data processing network, and display adapter 36 for connecting bus 12 to display device 38.

Figure 1:
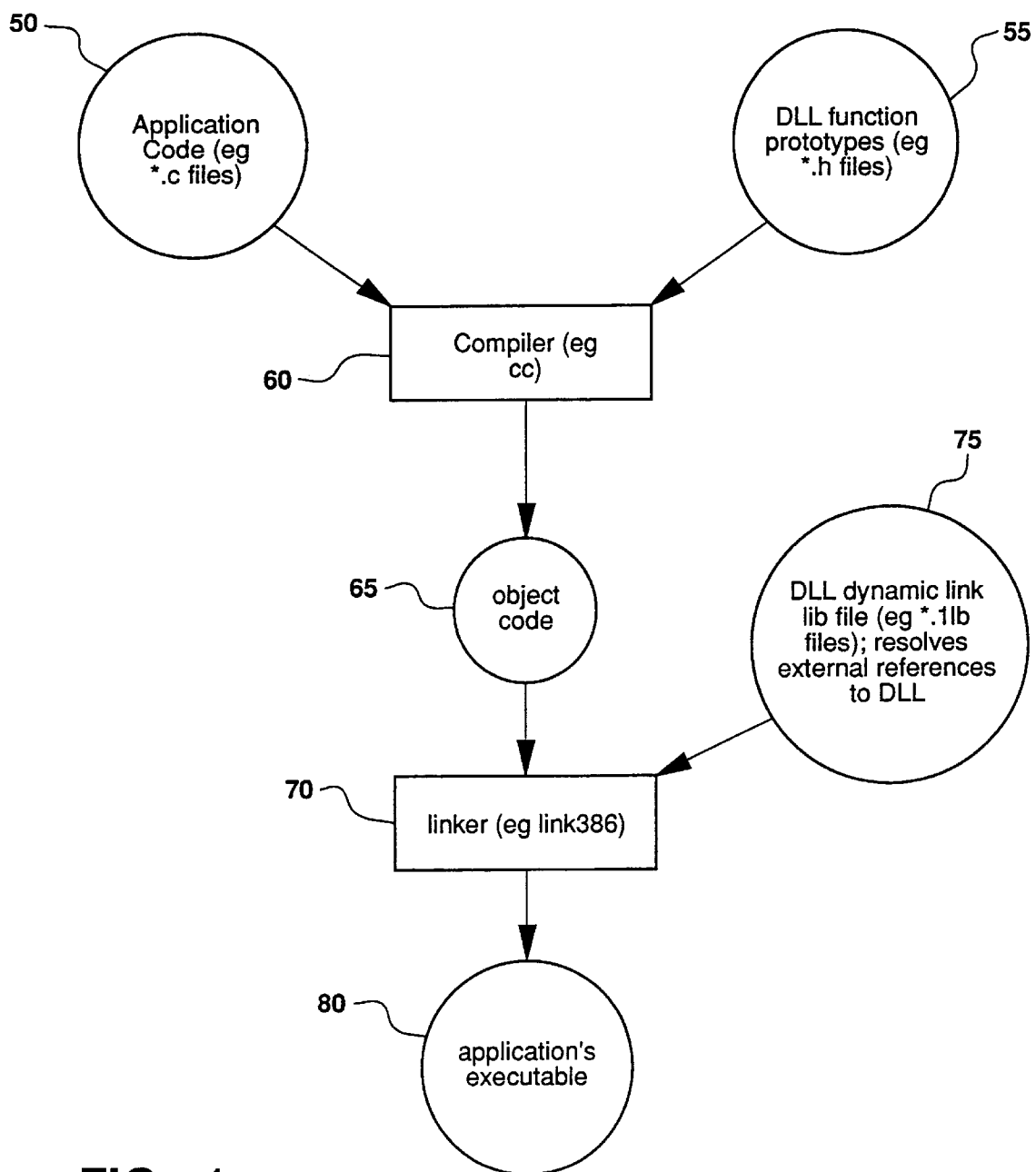
FIG. 1 illustrates the typical steps in compiling and linking a new program which utilizes dynamic link libraries (DLLs) which are not demand loaded.
Figure 2:
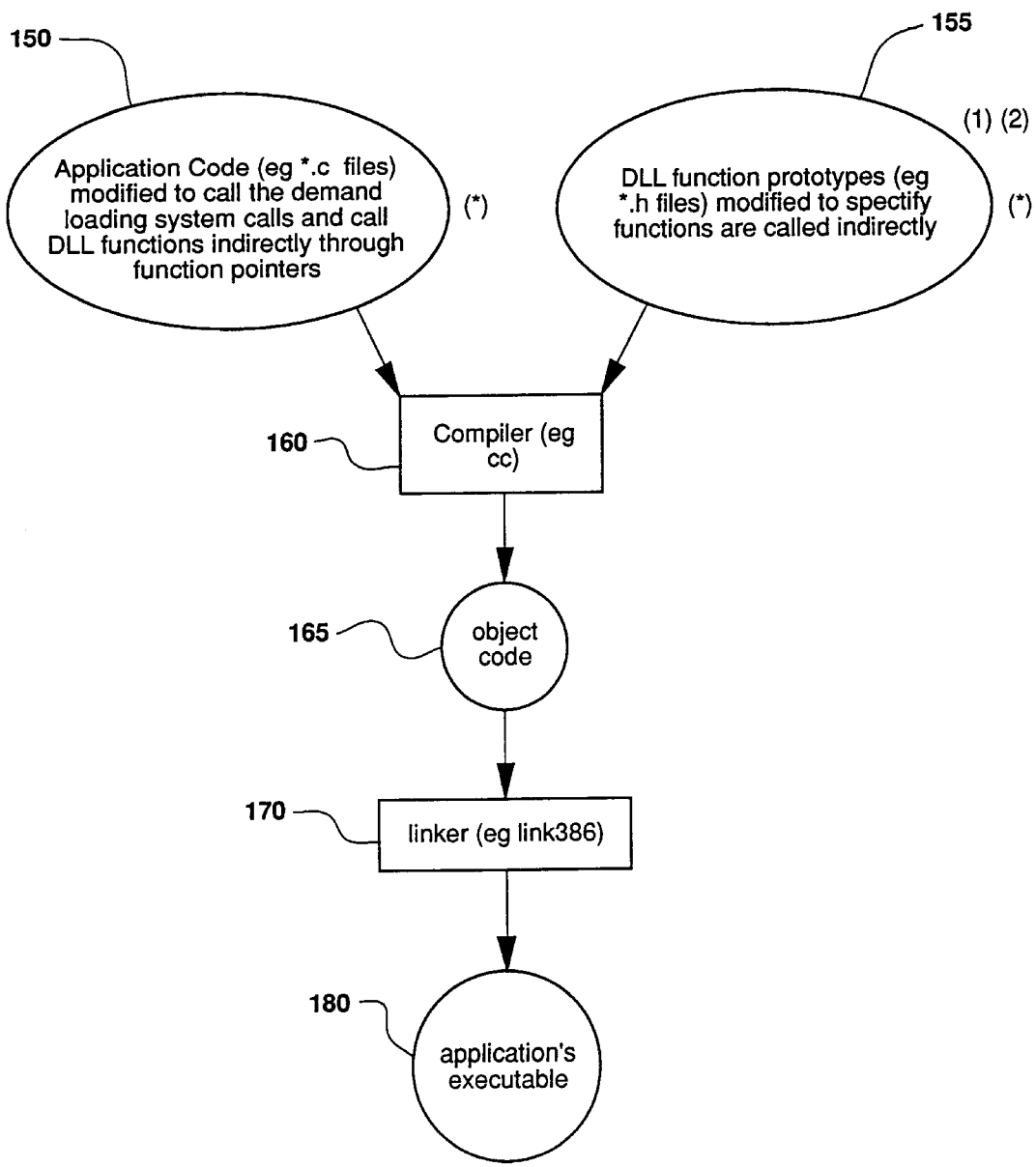
FIG. 2 illustrates the typical steps in compiling and linking a new program which utilizes DLLs which are demand loaded.
Figure 4:
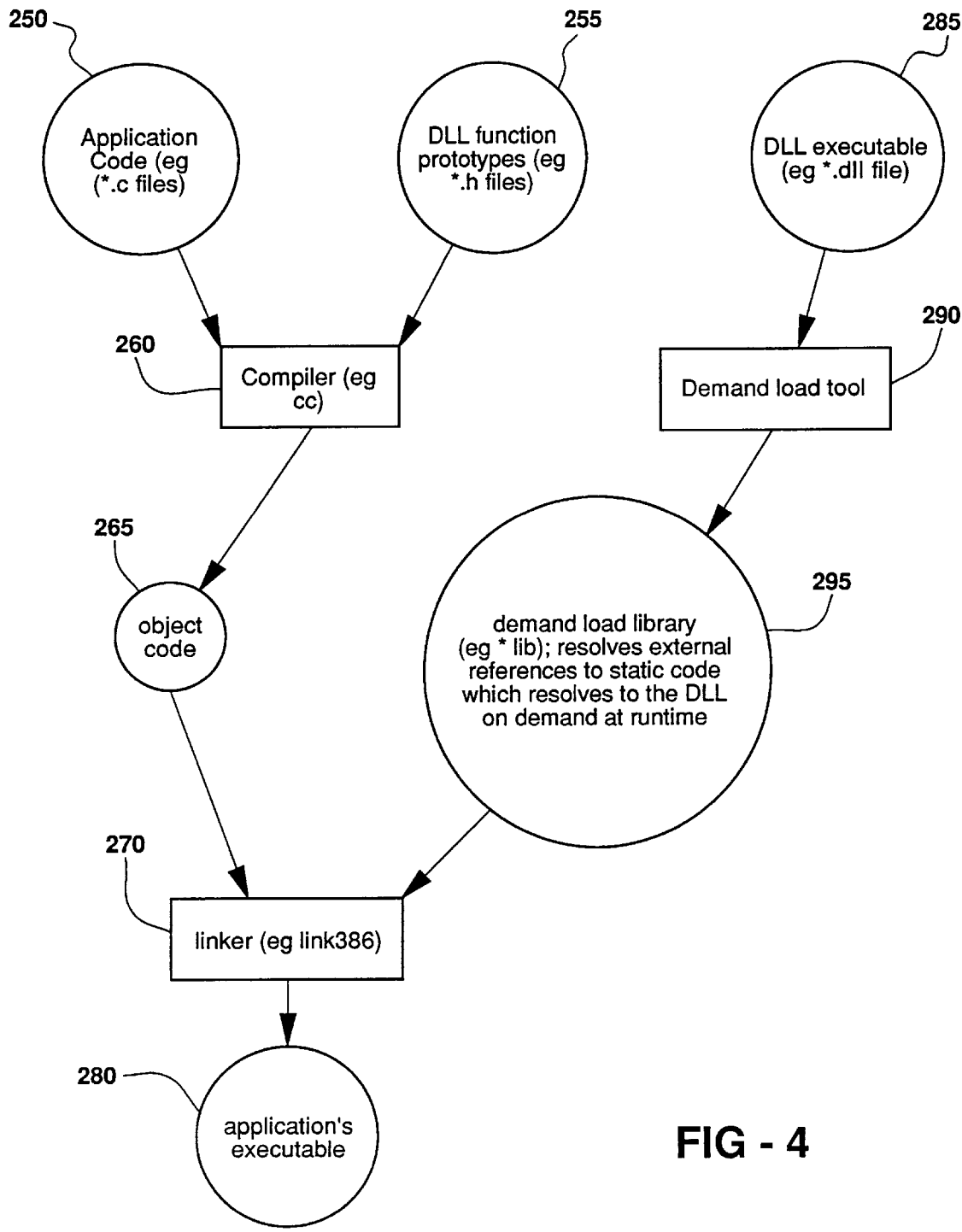
FIG. 4 illustrates the steps in compiling and linking a new program which utilizes a DLL which is demand loaded according to the apparatus and method of the present invention.

Referring now to FIG. 4, reference numerals which are like or similar to the reference numerals of FIG. 1 are intended to indicate like or similar steps. FIG. 4 illustrates a method which is implemented in an information handling system having an operating system for generating a demand load library for demand loading a DLL according to the present invention. The details of building or generating a demand load library will be explained further in connection with the description of FIGS. 7A–7C. In step 285, the DLL is inputted into a demand load tool which generates the demand load library. In step 290, the demand load library is generated by the demand load tool and then outputted in step 295. The demand load library is statically linked by linker 270 with object code 265 from the application program to form the application program executable file which is loaded into the memory of the information handling system for execution thereon in conjunction with the system's operating system. The demand load library generated in step 290 replaces a reference library of the DLL. The reference library resolves references to the DLL. Thus, the programmer of the application program utilizing a DLL runs a demand loading tool implementing the method and apparatus of the present invention against the DLL to output a demand load library. The programmer of the application program then simply relinks the executable program with the new demand load library and the demand loading is provided.

The demand load library is generated or built from information that is taken from the DLL's linear EXE header. The format of the linear EXE header is documented in IBM OS/2 16/32 Bit Module Format (OMF) and Linear Executable module format (LX). Thus, the first step in generating or building the demand load library is finding all entry points into the DLL as listed in the EXE header. For each DLL entry point listed in the EXE header, the following information is extracted: the name of the DLL, the ordinal of the DLL, and the type of the DLL, that is, whether it is 16-bit or 32-bit. The name, ordinal, and type are used to automatically generate assembly language routines which act as the resolution point for calls to the DLL by a calling executable from an application program. The assembly language routines are assembled into object code and then packaged together along with some initialization routines to produce a demand load library for the DLL.

For each demand load library entry point, a unique assembly language file program code is generated, allowing the calling executable to only pick up those entry point routines which it uses. Either 32-bit or 16-bit code is generated depending upon the entry point type from the EXE header. It will be appreciated that the present invention could be extended to 64-bit or beyond. The generated code performs the steps of determining whether an address corresponding to the entry point has been called before. If the address corresponding to the entry point has not been called before, then a demand loading initialization routine is called, and the program code then jumps indirectly to the address corresponding to the entry point. An example of the generated program code following this format in C-like syntax is as follows:

```
if (entry_point_address == 0)
{
    call demload_initialization(entry_point_address, name, ordinal)
}
goto entry_point_address
```

Figure 5:
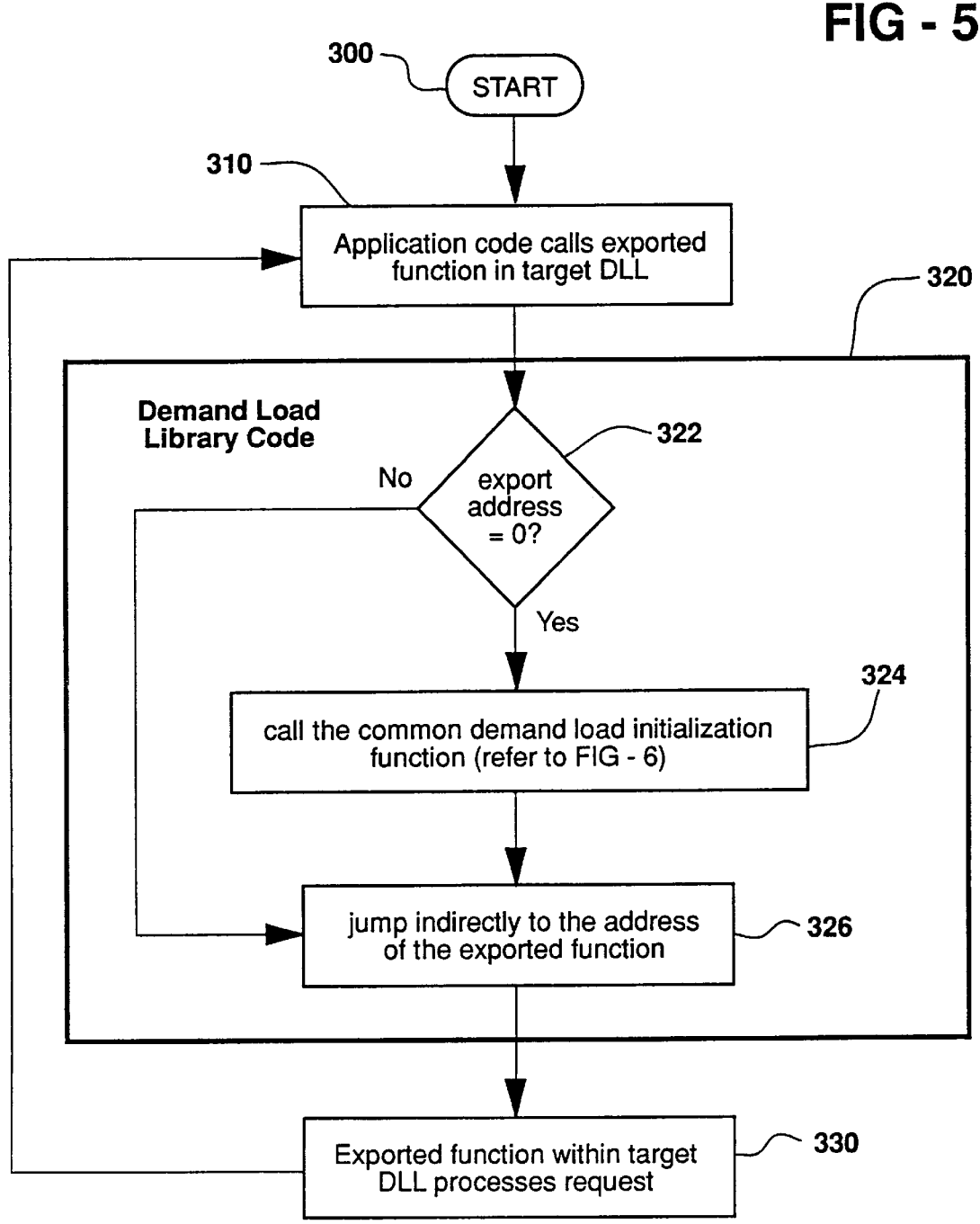
FIG. 5 illustrates a run-time flow chart of the present invention.

Referring now to FIG. 5, a run-time flowchart illustrating the present invention is shown. The process starts in step 300. In step 310, a calling executable from the application program calls a particular entry point of the DLL to export a corresponding function from the DLL. The call is then routed to the demand load library code of the demand load library in step 320. Then, it is first determined in step 322 whether the address corresponding to the entry point has been called before. If the entry point has not been called before, then the process proceeds to step 324 wherein the demand loading initialization routine is called. It is to be noted that the demand loading initialization routine will be described in further detail in connection with the description of FIGS. 7A–7C. After the process exits the demand load initialization routine in step 324, the process proceeds to step 326 wherein the program jumps indirectly to the address of the function to be exported. The function to be exported is executed to generate a result in step 330, and the result from step 330 is returned directly to the application program from step 310. If the address corresponding to the entry point has been called before, as determined in step 322, the process proceeds directly to step 326, bypassing step 324.

Figure 6:
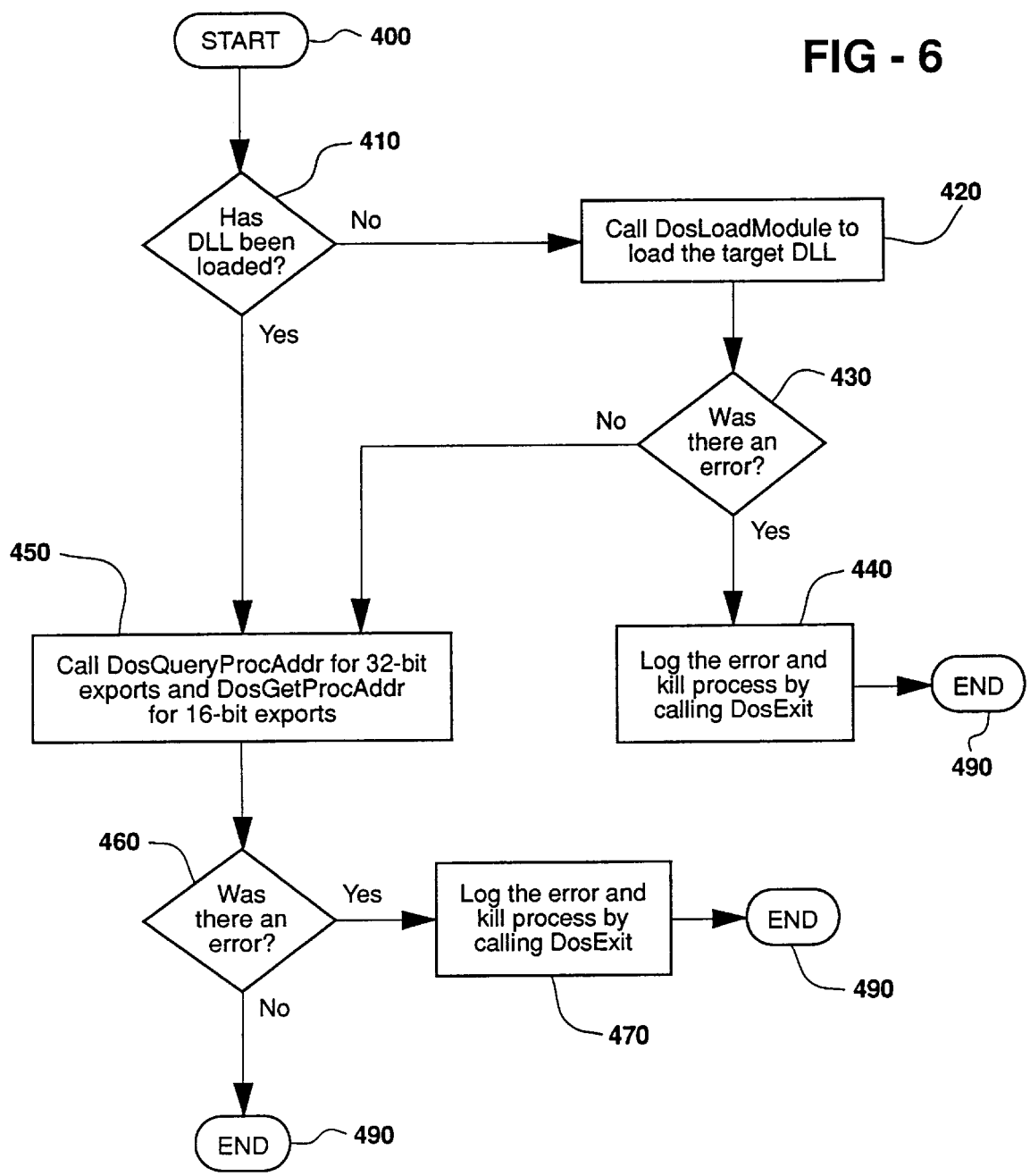
FIG. 6 illustrates a run-time flow chart of the demand load initialization routine of the present invention.

Referring now to FIG. 6, the demand load initialization routine issues the OS/2 DosLoadModule and DosQueryProcAddr APIs to demand load the DLL entry point. Inputs to the APIs are the entry point name and entry point ordinal, which are passed to the initialization routine. The output of the initialization routine is the entry point virtual address. The demand load initialization routine starts in step 400. In step 410, it is determined whether the DLL has already been loaded. If the demand load library has not already been loaded, the DosLoadModule API is called to load the DLL in step 420. In step 430, it is determined whether there was an error in performing the DosLoadModule API routine. If there was an error in step 430, the error is logged, and the process is stopped by calling a DOS Exit routine in step 440, and the process ends in step 490. If there was no error determined in step 430, the process proceeds to step 450 where the DosQueryProcAddr API is called for 32-bit exports, and DosGetProcAddr is called for 16-bit exports. In step 460, it is determined whether there as an error in either routine. If an error occurred, the process proceeds to step 490 where the process ends and an address corresponding to the entry point is outputted so that the program may jump to the function to be exported. If there was an error determined in step 460, the process proceeds to step 470 where the error is logged, and the process is terminated by calling the Dos Exit routine wherein the process then proceeds to step 490 where the process ends.

The demand load library code does not require any knowledge of the number or kind of parameters passed to a target DLL. It gets by with this by not modifying the program or system stack in the information handling system, which contains the parameter list for the call. To the target DLL, the call appears to have come directly from the original caller. This is beneficial in that no access to the target DLL's source code is required, making the tool easy to use.

Another implication of not modifying the stack on the call is efficiency in performing the demand load function. The efficiency comes from skipping the demand load code on the return path of the call. Because the call appears to the target DLL as if it came from the original DLL, the return from the call goes directly to the original caller's code, skipping the demand load code in between.

In order to provide the non-stack modifying code, the demand load code is implemented in assembly language. Another benefit of assembly language is additional efficiency. After an entry point has been called for the first time and the demand load initialization function has been executed, subsequent calls only take three instructions: compare, conditional jump, and jump indirect. Thus, the cost of demand loading is negligible in terms of performance.

Some other efficiencies should be noted:

The demload_initialization routine is common for all entry points, so there is only one copy of it.

The demload_initialization routine checks to ensure that DosLoadModule( ) is only called once per process.

The demand load library code checks to ensure that the demload_initialization routine, and therefore the DosQueryProcAddr( ) API, is only called once per unique entry point.

The demand load library code is divided into individual object modules, one for each entry point in the target DLL. The benefit of this is the calling executable only pulls out of the library the code for the entry points it references. This granularity is provided by the tool generating the entry point code into separately compilable assembly files.

The only input to the demand load tool is the target DLL. No source code, header files, function prototypes, or other knowledge of the code to which it is being applied is necessary. The benefit is it could be applied to DLLs which come from any product, including those purchased off the shelf or not developed by the programmer using them.

One restriction about the demand loading technique disclosed in this invention should be noted. It does not work on data exports, only code exports. In other words, if a calling executable's reference to a target DLL is data, it cannot be demand loaded. This is because data references cannot be redirected without changing the code. Note if the calling executable does not reference the exported data, the target DLL can be demand loaded, even though it has data exports. A workaround to this problem is to repackage the exported data from the demand loaded DLL to a more frequently used or smaller DLL.

The demand load tool of the present invention, for example, may comprise a REXX script, a 32-bit C initialization program, and a 16-bit C initialization program. The REXX script takes only one input: the target DLL. It calls EXEHDR to extract the entry points and their attributes, generates the assembly language code, and generates a makefile. The makefile controls how the assembly language routines are built, either 16-bit or 32-bit, and what files go into building the library. NMAKE is run against the demand load makefile causing the demand load library to be built. Other configurations written in other code languages are possible.

Figure 7C:
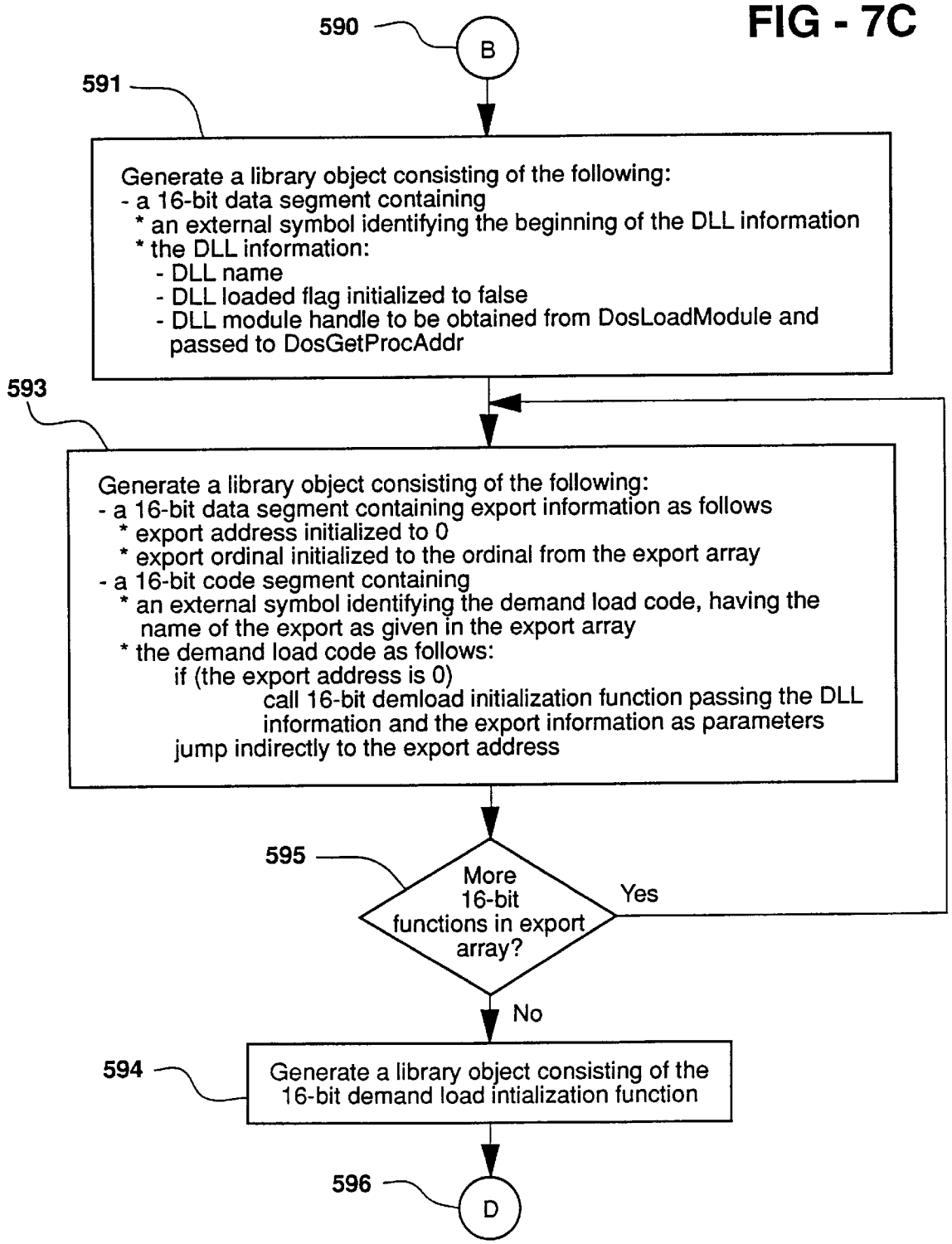

Referring now to FIGS. 7A–7C, a flowchart detailing the process by which the demand load library of the present invention is generated is shown. The process starts in step 500. For each function to be exported from the DLL, the process determines, in step 510, whether the export is a data export. If it is determined that the export is a data export, then an error message is printed, in step 520, which indicates to the programmer that data exports are not supported, and the process ends in step 530. In step 540, the name, type, and ordinal of the DLL is obtained. In step 550, it is determined whether there are any more exported functions. If there are more functions to be exported, the process returns to step 510. If there are no more functions to be exported, the process proceeds to step 560. In step 560, it is determined whether there are any 32-bit entry points. If there are any 32-bit entry points, the process proceeds to step 570. If there are not any 32-bit entry points, the process proceeds to step 580. In step 580, it is determined whether there are any 16-bit entry points. If there are any 16-bit entry points, the process proceeds to step 590. If there are not any 16-bit entry points, the process proceeds to step 600.

Step 570 includes the following substeps as illustrated in FIG. 7B: in step 571, a library object consisting of a 32-bit data segment containing an external symbol identifying the beginning of the DLL information consisting of the DLL name, DLL loaded flag initialized to false, and DLL module handle to be obtained from DosLoad0Module and passed to DocQueryProcAddr is generated. The process then proceeds to step 573 wherein, for each 32-bit in the export array, the process generates a library object consisting of a 32-bit data segment containing export information consisting of an export address initialized to 0 and an export ordinal initialized to the ordinal from the export array. The process also generates on the library object a 32-bit code segment containing an external symbol identifying the 32-bit demand load code (code for implementing step 320 in FIG. 5) having the name of the export as given in the export array and finally the demand load code. In step 575, it is determined whether there are more 32-bit functions in the export array. If there are more 32-bit functions in the export array, the process returns to step 573. If there are no more 32-bit functions in the export array, the process proceeds to step 574 where a library object consisting of the 32-bit demand load initialization routine (as illustrated in FIG. 6) is generated. After completing step 574, the process proceeds to step 576 wherein the process proceeds to step 580.

The process, in step 590, includes the following subprocesses as illustrated in FIG. 7C: in step 591, a library object consisting of a 16-bit data segment containing an external symbol identifying the beginning of the DLL information consisting of the DLL name, DLL load flag initialized to false, and DLL module handle to be obtained from DosLoadModule and passed to DosGetProcAddr is generated. The process then proceeds to step 593 wherein, for each 16-bit function, the process generates a library object consisting of a 16-bit data segment containing export information consisting of export address initialized to 0 and export ordinal initialized to the ordinal from the export array. The process also generates in the library object an external symbol identifying the demand load code having the name of the export as given in the export array and finally the demand load code. In step 595, it is determined whether there are any more 16-bit functions in the export array. If there are more 16-bit functions in the export array, the process loops back to step 593. If there are no more 16-bit functions in the export array, then the process proceeds to step 594 where a library object consisting of the 16-bit demand load initialization routine is generated. After completing step 594, the process proceeds to step 600. In step 600, all the library objects created are packaged in a single library file to create the demand load library. The process ends in step 610 with a demand load library corresponding to the DLL inputted to the process in step 500.

Figure 8:
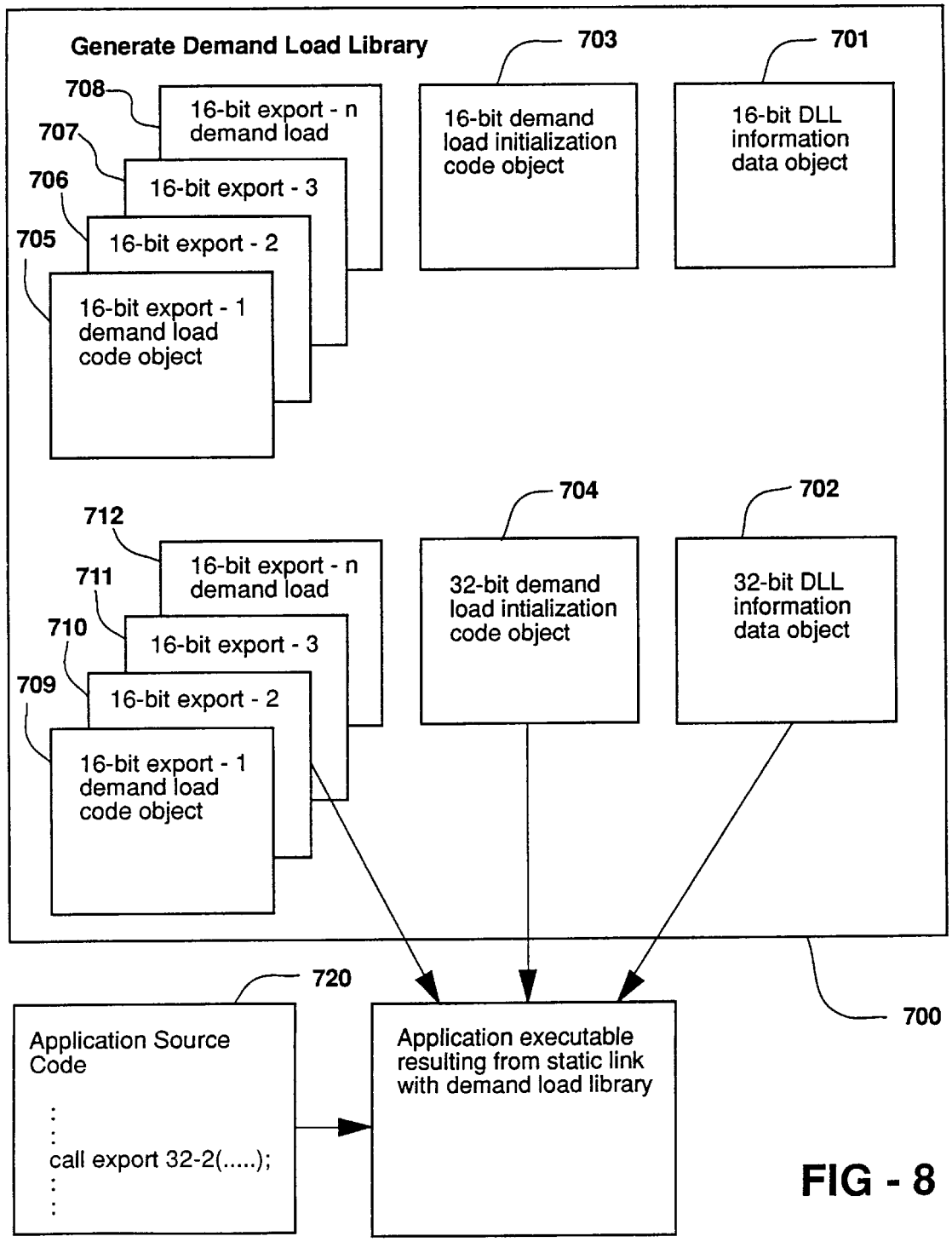
FIG. 8 illustrates the contents of a demand load library generated according to the present invention and the relationship between an application program and the demand load library.

Referring now to FIG. 8, the contents of a demand load library 700 generated according to the present invention and the relationship between an application program 720 and demand load library 700 are shown. Demand load library 700 consists of one 16-bit DLL information data object 701 generated in process step 591 if necessary, one 32-bit DLL information data object 702 generated in process step 571 if necessary, one 16-bit demand load initialization routine code object 703 generated in process step 594 if necessary, and one 32-bit demand load initialization routine code object 704 generated in process step 574 if necessary. Demand load library 700 also consists of demand load code for each 16-bit export 705–708 and demand load code for each 32-bit export 709–712. Application source code 720 is shown containing only a reference or call to 32-bit export 710. When the application source code 720 is statically linked with demand load library 700, the following will be linked: the demand load code corresponding to export 710, 32-bit demand load initialization routine code 704, and 32-bit DLL information data object 702. Thus, data and code objects in demand load library 700 are linked only when referenced or called by application source code 720.

Although the present invention and its advantages have been described in detail, it should be understood that various changes, substitutions and alterations can be made herein without departing from the spirit or scope of the invention as defined in the appended claims.

What is claimed is:

1. A method, implemented in an information handling system having an operating system, for demand loading a dynamic link library (DLL) having a reference library for resolving references to the DLL, said method comprising the steps of:
    finding entry points into the DLL;
    generating a demand load library including program code for performing the following steps for each entry point:
        determining whether an address corresponding to the entry point has been called before;
        if the address corresponding to the entry point has not been called before, then calling a demand loading initialization routine; and
        jumping to the address corresponding to the entry point; and
    replacing the reference library of the DLL with the demand load library.

2. The method, as recited in claim 1, wherein said step of calling a demand loading initialization routine includes the step of calling APIs from the operating system.

3. The method, as recited in claim 2, wherein said step of calling APIs includes the step of calling a load API for loading the DLL if the entry point has not been called before.

4. The method, as recited in claim 3, wherein said step of calling a load API further includes the step of inputting the name of the entry point to the load API.

5. The method, as recited in claim 4, wherein said step of calling APIs further includes the step of calling an address API for returning an address corresponding to the entry point.

6. The method, as recited in claim 5, further including the steps of:
    obtaining a name and an ordinal for each entry point; and
    passing the name and ordinal to the demand loading initialization routine.

7. The method, as recited in claim 6, wherein said step of calling an address API further includes the step of inputting the ordinal for the entry point to the address API.

8. The method, as recited in claim 1, wherein the step of generating program code further includes the step of generating assembly language program code and assembling the assembly language program code into object code.

9. The method, as recited in claim 8, further comprising the step of packaging the code generated into the demand load library.

10. The method, as recited in claim 9, further comprising the step of linking the object code of the demand load library with object code corresponding to an application program to thereby replace the reference library of the DLL with the demand load library.

11. The method, as recited in claim 1, further comprising the step of calling, by an application program, a particular entry point to export a corresponding function from the DLL.

12. The method, as recited in claim 11, further comprising the step of executing the function to generate a result.

13. The method, as recited in claim 12, further comprising the step of returning the result directly to the application program.

14. The method, as recited in claim 1, wherein the step of generating a demand load library comprises generating program code for performing a demand loading initialization routine.

15. The method, as recited in claim 1, wherein the step of generating a demand load library comprises generating program code for calling APIs from the operating system.

16. The method, as recited in claim 1, further comprising the step of packaging the code generated in the demand load library.

17. The method, as recited in claim 16, further comprising the step of linking the object code of the demand load library with object code corresponding to an application program to thereby replace the reference library of the DLL with the demand load library.

18. A method, implemented in an information handling system having an operating system, for generating a demand load library for demand loading a DLL, said method comprising the steps of:
    finding entry points into the DLL; and
    generating program code for performing the following steps for each entry point:
        determining whether an address corresponding to the entry point has been called before;
        if the address corresponding to the entry point has not been called before, then calling a demand loading initialization routine; and
        jumping to the address corresponding to the entry point.

19. The method, as recited in claim 18, wherein said step of calling a demand loading initialization routine includes the step of calling APIs from the operating system.

20. The method, as recited in claim 19, wherein said step of calling APIs further includes the step of calling a load API for loading the DLL.

21. The method, as recited in claim 20, wherein said step of calling a load API further includes the step of inputting the name of the entry point to the load API.

22. The method, as recited in claim 21, wherein said step of calling APIs further includes the step of calling an address API for returning an address corresponding to the entry point.

23. The method, as recited in claim 22, further including the steps of:
obtaining a name and an ordinal for each entry point; and
passing the name and the ordinal to the demand loading initialization routine.

24. The method, as recited in claim 23, wherein said step of calling an address API further includes the step of inputting the ordinal for the entry point to the address API.

25. The method, as recited in claim 18, wherein the step of generating program code further includes the steps of generating assembly language program code and assembling the assembly language program code into object code.

26. The method, as recited in claim 25, comprising the step of packaging the code generated into the demand load library.

27. The method, as recited in claim 25, further comprising the step of linking the object code of the demand load library with object code corresponding to an application program to thereby replace a reference library of the DLL with the demand load library.

28. The method, as recited in claim 18, wherein said step of finding includes the step of finding entry points corresponding to instruction exports.

29. The method, as recited in claim 28, wherein said step of finding further includes the step of separating entry points corresponding to instruction exports from data exports.

30. The method, as recited in claim 29, wherein said step of finding further includes the step of repacking the DLL into a first DLL containing entry points corresponding to instruction exports and a second DLL containing entry points corresponding to data exports.

31. A computer program product comprising:
a program storage device readable by a computer system tangibly embodying a program of instructions executable by said computer system to generate a demand load library for demand loading a DLL, said program of instructions implementing the following method:
finding entry points into the DLL; and
generating program code for performing the following steps for each entry point:
determining whether an address corresponding to the entry point has been called before;
if the address corresponding to the entry point has not been called before, then calling a demand loading initialization routine; and
jumping to the address corresponding to the entry point.

32. The computer program product, as recited in claim 31, wherein said step of calling a demand loading initialization routine includes the step of calling APIs from the operating system.

33. The computer program product, as recited in claim 32, wherein said step of calling APIs further includes the step of calling a load API for loading the DLL.

34. The computer program product, as recited in claim 33, wherein said step of calling a load API further includes the step of inputting the name of the entry point to the load API.

35. The computer program product, as recited in claim 32, wherein said steps of calling APIs further includes the step of calling an address API for returning an address corresponding to the entry point.

36. The computer program product, as recited in claim 35, wherein the method further including the steps of:
obtaining a name and an ordinal for each entry point; and
passing the name and the ordinal to the demand loading initialization routine.

37. The computer program product, as recited in claim 36, wherein said step of calling an address API further includes the step of inputting the ordinal for the entry point to the address API.

38. The computer program product, as recited in claim 31, wherein the step of generating program code further includes the steps of generating assembly language program code and assembling the assembly language program code into object code.

39. The computer program product, as recited in claim 38, comprising the step of packaging the code generated into the demand load library.

40. The computer program product, as recited in claim 39, further comprising the step of linking the object code of the demand load library with object code corresponding to an application program to thereby replace a reference library of the DLL with the demand load library.

41. The computer program product, as recited in claim 31, wherein said step of finding includes the step of finding entry points corresponding to instruction exports.

42. The computer program product, as recited in claim 41, wherein said step of finding further includes the step of separating entry points corresponding to instruction exports from data exports.

43. The computer program product, as recited in claim 42, wherein said step of finding further includes the step of repacking the DLL into a first DLL containing entry points corresponding to instruction exports and a second DLL containing entry points corresponding to data exports.

44. An information handling system comprising;
at least one processor;
memory operably associated with said processor;
an application program stored in said memory, said program including a dynamic link library (DLL); and
a demand load library stored in said memory for demand loading the DLL, the demand load library including:
means for determining whether an address corresponding to an entry point has been called before;
a demand loading initialization routine; and
means for returning an address corresponding to said entry point for calling said entry point to export a corresponding function from the DLL, wherein the demand loading initialization routine loads the DLL if the entry point has not been called before.

45. The information handling system, as recited in claim 44, further including:
means for executing a function from said DLL to generate a result; and
means for returning the result directly to the application program.

46. A computer program product in a computer readable medium, comprising:
a dynamic link library (DLL); and
a demand load library for demand loading said DLL, the demand load library including:
means for determining whether an address corresponding to an entry point has been called before;

a demand loading initialization routine; and means for returning an address corresponding to the entry point for calling the entry point to export a corresponding function from the DLL, wherein the demand loading initialization routine loads the DLL if the entry point has not been called before.

* * * * *